(12) United States Patent
Haas

(10) Patent No.: US 9,816,550 B2
(45) Date of Patent: Nov. 14, 2017

(54) BALL-BEARING-SUPPORTED ATTACHMENT POINT

(71) Applicant: RUD KETTEN RIEGER & DIETZ GMBH U. CO. K.G., Aalen (DE)

(72) Inventor: Simon Haas, Horn (DE)

(73) Assignee: RUD KETTEN RIEGER & DIETZ GMBH U CO. K.G. (DE)

( * ) Notice: Subject to any disclaimer, the term of this patent is extended or adjusted under 35 U.S.C. 154(b) by 0 days.

(21) Appl. No.: 14/779,598

(22) PCT Filed: Mar. 26, 2014

(86) PCT No.: PCT/EP2014/056041
§ 371 (c)(1),
(2) Date: Sep. 24, 2015

(87) PCT Pub. No.: WO2014/154739
PCT Pub. Date: Oct. 2, 2014

(65) Prior Publication Data
US 2016/0047413 A1    Feb. 18, 2016

(30) Foreign Application Priority Data
Mar. 28, 2013  (DE) .................. 10 2013 205 723

(51) Int. Cl.
*A47B 96/06* (2006.01)
*F16C 19/18* (2006.01)
(Continued)

(52) U.S. Cl.
CPC .............. *F16C 19/184* (2013.01); *B66C 1/66* (2013.01); *F16C 33/581* (2013.01); *F16G 15/08* (2013.01); *F16M 13/02* (2013.01)

(58) Field of Classification Search
CPC .......... B66C 1/64; F16G 15/08; F16C 19/184; F16C 33/581
See application file for complete search history.

(56) References Cited

U.S. PATENT DOCUMENTS

| 1,867,574 A | 7/1932 | Leman |
| 2,651,533 A | 9/1953 | Miller |

(Continued)

FOREIGN PATENT DOCUMENTS

| CN | 201670653 U | 12/2010 |
| DE | 19644298 A1 | 4/1998 |

(Continued)

OTHER PUBLICATIONS

German Search Report for 10 2013 205 723.7, dated Feb. 12, 2014.
(Continued)

*Primary Examiner* — Amy Sterling
(74) *Attorney, Agent, or Firm* — Edell, Shapiro & Finnan, LLC

(57) ABSTRACT

The invention relates to an attachment point (1) comprising a connecting element (3) which comprises a section (5) for connecting an attachment device, a seat (9) for a fastening device (11) and at least one pair of rolling bearings (23) between the seat (9) and the connecting element (9), wherein the connecting element (3) is rotatable relative to the seat (9) and wherein the rolling bearings (25, 27) of the pair of rolling bearings each comprise at least one rolling element (29). In order to provide an attachment point that exhibits little wear, is easily rotated also when lifting heavy loads and is easy to install, it is according to the invention provided that the rolling bearings (25, 27) of the pair of rolling bearings (23) comprise an outer race (39, 41) attached to the connecting element (3).

18 Claims, 4 Drawing Sheets

(51) Int. Cl.
  *B66C 1/66*     (2006.01)
  *F16G 15/08*    (2006.01)
  *F16C 33/58*    (2006.01)
  *F16M 13/02*    (2006.01)

(56) References Cited

U.S. PATENT DOCUMENTS

| | | | |
|---|---|---|---|
| 3,371,951 A | 3/1968 | Bryant | |
| 5,484,220 A | 1/1996 | Lewis et al. | |
| 5,806,653 A * | 9/1998 | Ahls | B66B 23/026 198/326 |
| 8,740,275 B2 * | 6/2014 | Smetz | B66C 1/66 294/215 |
| 8,757,693 B2 * | 6/2014 | Fuller | B66C 1/66 294/215 |
| 9,193,570 B2 * | 11/2015 | Norpoth | B66C 1/66 |
| 2003/0095729 A1 * | 5/2003 | Post | F16C 23/045 384/213 |
| 2005/0069379 A1 * | 3/2005 | Smetz | B66C 1/66 403/164 |
| 2013/0236340 A1 * | 9/2013 | Kawano | F04B 17/03 417/420 |

FOREIGN PATENT DOCUMENTS

| | | |
|---|---|---|
| DE | 10062971 C1 | 8/2002 |
| DE | 10013845 C2 | 4/2003 |
| DE | 10164598 B4 | 12/2006 |
| DE | 202012100764 U1 | 4/2012 |
| DE | 10196765 B4 | 3/2013 |
| EP | 0004830 A1 | 10/1979 |
| EP | 1456560 B1 | 9/2004 |
| EP | 2495459 A1 | 9/2012 |
| FR | 543931 A | 9/1922 |
| TW | 200301219 A | 7/2003 |

OTHER PUBLICATIONS

International Search Report for PCT/EP2014/056041, dated Jul. 9, 2014.
Chinese Search Report for 2014 800 187 28.5, dated Jul. 12, 2016.

* cited by examiner

BALL-BEARING-SUPPORTED ATTACHMENT POINT

The invention relates to an attachment point comprising a connecting element which comprises a section for connecting an attachment device, a seat for a fastening device and at least one pair of rolling bearings between the seat and the connecting element, wherein the connecting element is rotatable relative to the seat and wherein the rolling bearings of the pair of rolling bearings each comprise at least one rolling element.

Attachment points with rotatable connecting elements are known and are primarily used in lifting technology.

An attachment point with a connecting element for a fastening device rotatable relative to the seat is known from DE 100 13 845 C2. This German patent specification of the applicant describes an attachment point with a slide bearing. The slide bearing is formed by two bushings inserted into the connecting element. This attachment point provides a good load-carrying capacity, however, rotatability is limited, in particular with heavy loads.

European patent specification of the applicant EP 1 456 560 B1 describes an attachment point configured as a ring-bolt whose rotatability is improved by a pair of rolling bearings The attachment point provides good rotatability even when lifting heavy loads. It is disadvantageous, however, that the connection eye for connecting an attachment device is rigidly connected to a base of the attachment eye and can therefore not be pivoted out from an axis of the fastening device. Likewise disadvantageous is that this attachment point experiences great wear when lifting heavy loads.

An attachment point with the features mentioned above is also known from DE 101 64 598 B4. This patent specification of the applicant comprises an attachment point, where a pair of rolling bearings is disposed between the connecting element and the fastening device. The attachment point provides good mobility and sufficient lifting capacity for lifting loads. However, the known attachment points experience great wear and thereby have only inadequate service life. In addition, many steps and tools are needed for the assembly of the known attachment points which unnecessarily complicates and increases the costs of installation.

It is therefore an object of the invention to provide an attachment point of the aforementioned kind which has a long service life with high mobility and high load-bearing capacity while being quickly and easily mounted.

This object for the aforementioned attachment point is satisfied in that the rolling bearings of the pair of rolling bearings comprise an outer race attached to the connecting element.

The solution according to the invention offers the advantage that the materials for the outer race and the connecting element can be selected and machined individually. They can therefore each be optimized for distinct requirements as part of a bearing and as a connecting element for connecting an attachment device.

The use of material respectively adapted for the intended application of the individual components clearly reduces wear and increases the service life over prior art attachment points.

The solution according to the invention can be further improved by various embodiments that are advantageous on their own and can be combined at random. These embodiments and the advantages associated therewith shall be described below.

The rolling bearings can according to one advantageous embodiment each comprise at least one spherical rolling element which is by the outer race enclosed by more than 90°. The extended enclosure of the at least one rolling element permits high load-carrying capacity of the rolling bearings in both the axial and the radial directions.

In order to obtain a particularly compact outer race, it is advantageous if a radial width of the outer race of at least one rolling bearing corresponds to the radial dimension of a rolling element abutting the outer race.

The outer race of a rolling bearing can according to a further advantageous embodiment comprise at least one undercut in which at least one rolling element of the rolling bearing is supported in a positive-fit manner. Particular broad enclosure of the rolling elements is possible due to the undercut. In addition, the undercut facilitates assembly of the attachment point according to the invention since the rolling elements do not have to be held by separate tools or parts during assembly.

In order to design the configuration as simple as possible, the at least one undercut can form a track for at least one rolling element.

The seat can according to a further advantageous embodiment comprise at least one bushing, which forms an inner race for at least one rolling bearing of the pair of rolling bearings, wherein the inner race encloses at least one spherical rolling element of the rolling bearing by more than 90°. The inner races then form advantageous counterparts for the outer races and like the outer races allow such a large enclosure of the rolling elements, whereby they can bear both axial and radial loads.

Particularly simple mounting of an attachment point of the invention and an advantageous enclosure of the rolling elements can be achieved in that the inner race of at least one rolling bearing comprises an undercut in which at least one rolling element of the rolling bearing is supported in a positive-fit manner.

A particularly simple and compact design of an inner race can be achieved in that at least one undercut forms a track for at least one rolling element.

A particularly simple and quick assembly and a reliable fit of the seat in the connecting element can be achieved in that the seat comprises two bushings that are axially connected via a press-fit connection and each comprise an inner race.

The installation of an attachment point can be simplified in that an outer race is at at least one bushing captively supported by at least one rolling element.

According to a further advantageous embodiment, the seat can comprise a bushing with an inner thread and a drive mechanism that is rotatably drivable by positive-fit engagement and accessible from the outside. Such a configuration makes it possible to screw the seat directly into a fastening device. The drive mechanism can there inter alia be a seat for a polygon tool. The drive mechanism can be formed, for example, by a hexagonal member which is drivable by a suitable wrench.

Any undesirable rotation of the attachment point, for example, due to gravity or due to vibrations, can be prevented in that a braking member is disposed between the seat and the connecting element and connects the seat and the connecting element in a frictionally engaged manner.

A particularly simple configuration of an attachment point can be achieved in that the braking member forms a sealing element of the rolling bearing.

The braking effect of the braking member can according to a further embodiment be improved in that the braking member is arranged in the area of the press-fit connection between the seat and the connecting element.

A particularly high load-carrying capacity and advantageous load distribution can be achieved in that at least one rolling bearing of the pair of rolling bearings is a solid ball.

The outer races can, from the perspective in the direction of the longitudinal axis of the fastening member, be disposed between the inner races. This results in a particularly compact and stable construction of an attachment point.

A compact embodiment of the seat can be achieved in that the outer races are aligned flush with the inner races.

In order to be able to bear particularly high loads, the rolling bearings can be designed without a cage for the rolling elements.

To improve the flexibility of the attachment point, the section can comprise a captively connected and pivotally mounted attachment element for connecting an attachment device. The attachment element can in particular have the shape of a shackle. The attachment element can according to one advantageous embodiment be pivotable about a pivot axis that is perpendicular to a longitudinal axis of the fastening device.

In order to provide an attachment point which is adaptable for different attachment devices, the attachment element can be connected to the connecting element via a detachable connection. The detachable connection can in particular be configured as a screw connection.

The seat for the fastening device can in particular be formed by a seat chamber. The seat can further be formed by a substantially cylindrical element. The fastening device can be guided through the seat and traverse the latter.

The invention is explained in more detail by way of example using various embodiments with reference to the drawings. The feature combinations illustrated in the embodiments by way of example can following the above-explained be added other features according to the properties of the attachment point of the invention required for a particular application. Individual features can in accordance with the above explanations also be omitted in the embodiments described where the effect of this feature in a specific case of application is irrelevant.

The same reference numerals are in the drawings always used for elements of the same function and/or the same construction, where FIG. 1 shows a section through an advantageous embodiment;

FIG. 2b shows a plan view of the embodiment shown in FIG. 2a;

Figure 1:
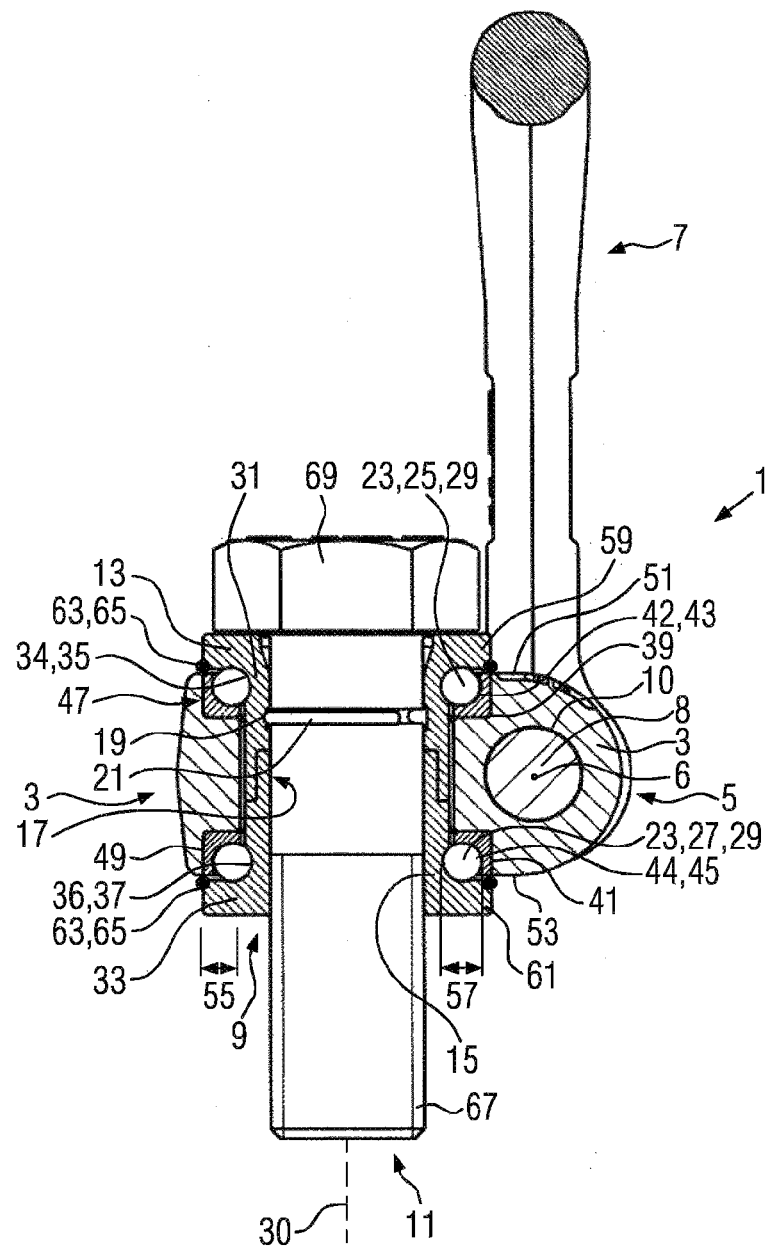

FIG. 1 shows a first advantageous embodiment of an attachment point 1 according to the invention. Attachment point 1 comprises a connecting element 3. Connecting element 3 has a section 5 for connection to an attachment device. Section 5 comprises a captively connected and pivotally mounted attachment element 7. Attachment element 7 is used to connect an attachment device and can be configured having the shape of a shackle.

Figure 3:
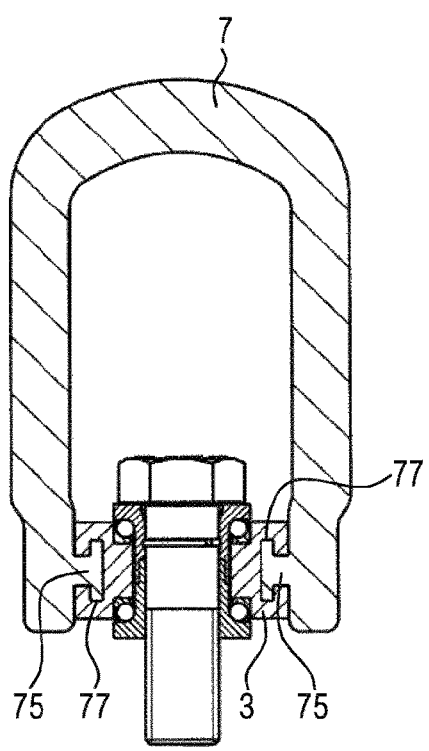
FIG. 3 shows a section through an embodiment with a centrally supported attachment element.

Attachment element 7 is attached eccentrically to attachment point 1. A centric support of an attachment element 7 is shown in FIG. 3. Attachment element 7 is pivotable about pivot axis 6 which is perpendicular to a longitudinal axis 30 of fastening device 11.

Attachment element 7 can be supported by a fastening element 8, e.g. a bolt, extending along pivot axis 6 and being guided through a support opening 10 in connecting element 3. Fastening element 8 can be secured by a screw connection at the connecting element.

The connecting element 3 is traversed by the seat 9 for the fastening device 11. Seat 9 comprises bushings 13 and 15. Bushings 13 and 15 are interconnected by a press-fit connection 17. A groove 19 can be disposed in the interior of seat 9. Fastening device 11 can comprise a spring ring 21 which upon insertion of fastening device 11 into seat 9 snaps into groove 19 and holds fastening device 11 captively in seat 9.

Connecting element 3 is rotatable relative to seat 9 about longitudinal axis 30 of fastening device 11.

A pair of rolling bearings 23 is located between seat 9 and connecting element 3. The pair of rolling bearings 23 is composed of rolling bearings 25 and 27. Rolling bearings 25 and 27 of the embodiment comprise spherical rolling elements 29. Attachment point 1 according to the invention is not limited to the use of spherical rolling elements. The use of rolling elements having other shapes, such as cylinders, needles or cones are likewise possible.

Rolling bearings 25 and 27 are arranged in a circle, where the circular planes formed by rolling bearings 25 and 27 are disposed perpendicular to longitudinal axis 30 of fastening device 11.

Bushings 13 and 15 of seat 9 form inner races 31 and 33 for rolling bearings 25 and 27 of the pair of rolling bearings 23. Inner races 31 and 33 enclose spherical rolling elements 29 of rolling bearings 25 and 27 each by more than 90°. Inner races 31 and 33 comprise undercuts 42 and 44 for positive-fit mounting of spherical rolling elements 29.

Rolling bearings 25 and 27 of the pair of rolling bearings 23 comprise outer races 39 and 41. Outer races 39 and 41 are attached to connecting element 3. Outer races 39 and 41 enclose spherical rolling elements 29 each by more than 90°. Outer races 39 and 41 each comprise an undercut 34 and 36 in which rolling elements 29 are supported in a positive-fit manner. Connecting element 3 has flat recesses 47 and 49 for receiving outer races 39 and 41.

Undercuts 42 and 44 of inner races 31 and 33 and undercuts 34, 36 of outer races 39 and 41 form tracks 35, 37, 43 and 45 for rolling elements 29.

Outer races 39 and 41 preferably connect flush with upper side 51 and lower side 53 of connecting element 3. Spherical rolling elements 29 are embedded in outer races 39 and 41 such that they each to a small extent, which in particular should not exceed one third of the diameter of rolling elements 29, protrude beyond upper side 51 and lower side 53 of connecting element 3. Alternatively, outer races 41 and 39 can be configured such that spherical rolling elements 29 are fully received within connecting element 3.

Outer races 39 and 41 are dimensioned such that a radial width 55 of outer races 39 and 41 corresponds to the radial dimension 57 of a spherical rolling element 29 placed on an outer race 39 and 41.

Bushings 13 and 15 form ring flanges 59 and 61 between which the pair of rolling bearings 23 and connecting element 3 are securely supported. Outer races 39 and 41 are disposed between ring flanges 59 and 61. The outer diameters of ring flanges 59 and 61 can correspond to the outer diameters of outer races 39 and 41.

Sealing elements 63 for sealing rolling bearings 25 and 27 can be mounted between bushings 13 and 15 and outer races 39 and 41. Sealing elements 63 can form braking members 65 for preventing rotation of seat 9 due to vibrations or gravity influences. Alternatively, braking members 65 can be present in other positions between seat 9 and connecting element 3.

Fastening device 11 comprises a thread 67 and a screw head 69 to fasten attachment point 1 to an object to be lifted. Alternatively, other sufficiently load-bearing fastening devices can also be used. Fastening device 11, in addition to fastening attachment point 1 to an object to be lifted, serves holding together the two bushings 13 and 15 that are pressed together.

Rolling bearings 25 and 27 are configured as solid balls and comprise no cages. This allows a particularly high load to be carried.

Figure 2A:
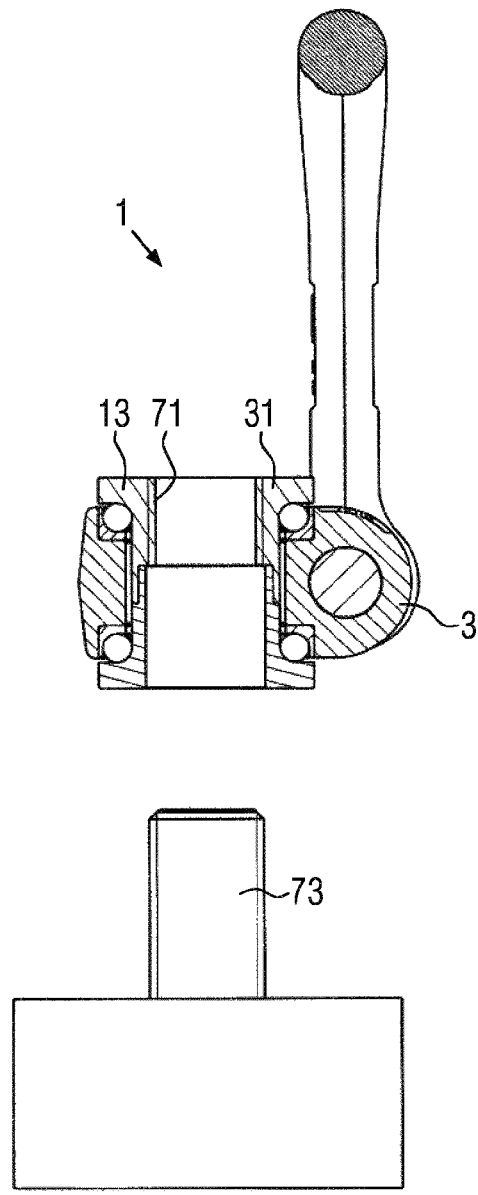
FIG. 2a shows a section through an embodiment comprising a bushing with a drive mechanism.

FIG. 2a shows a section through a further advantageous embodiment of an attachment point 1 according to the invention in which upper bushing 13 has an inner thread 71. This embodiment can be screwed directly onto a fastening member provided with a mating thread, such as a threaded pin 73.

For easy assembly, inner race 31 of bushing 13 can be formed as a drive mechanism 74, for example, as a polygonal head for a matching tool, such as a wrench. Bushing 13 can therewith be screwed onto threaded pin 73, whereby attachment point 1 is fastened to the object to be lifted.

Figure 2B:
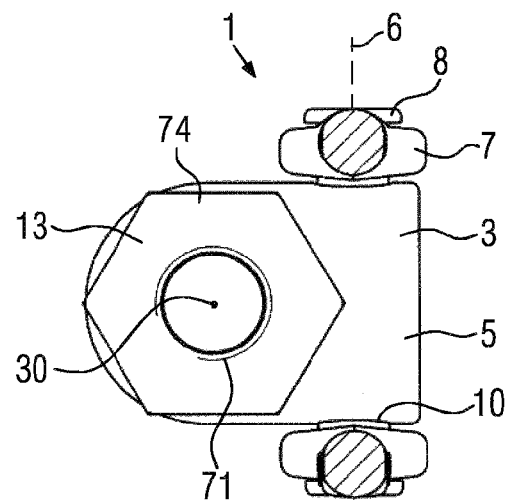

FIG. 2b shows attachment point 1 illustrated in FIG. 2a in a plan view.

Bushing 13 comprises drive mechanism 74. Drive mechanism 74 is configured in the form of a hexagonal screw so that it can be driven by use of a suitable wrench or other tool to rotate about longitudinal axis 30. Bushing 13 has inner thread 71 for being screwed onto a fastening member such as a threaded pin 73.

Connecting element 3 in this embodiment has an eccentrically disposed section 5 for receiving attachment element 7.

In section 5, connecting element 3 comprises the end-to-end support opening 10, through which a fastening element 8 is guided. Fastening element 8 traverses attachment element 7, whereby attachment element 7 is supported captively and pivotally about pivot axis 6.

FIG. 3 shows a sectional view of a further advantageous embodiment. Attachment element 7 is centrically attached to attachment point 1. When lifting a load, bearings 25 and 27 are primarily loaded in the axial direction.

Connecting element 3 encloses seat 9 in an annular manner.

Attachment element 7 with support elements 75 engages in correspondingly shaped seat openings 77 of connecting element 3 and is captively and pivotally held therein.

Figure 4:
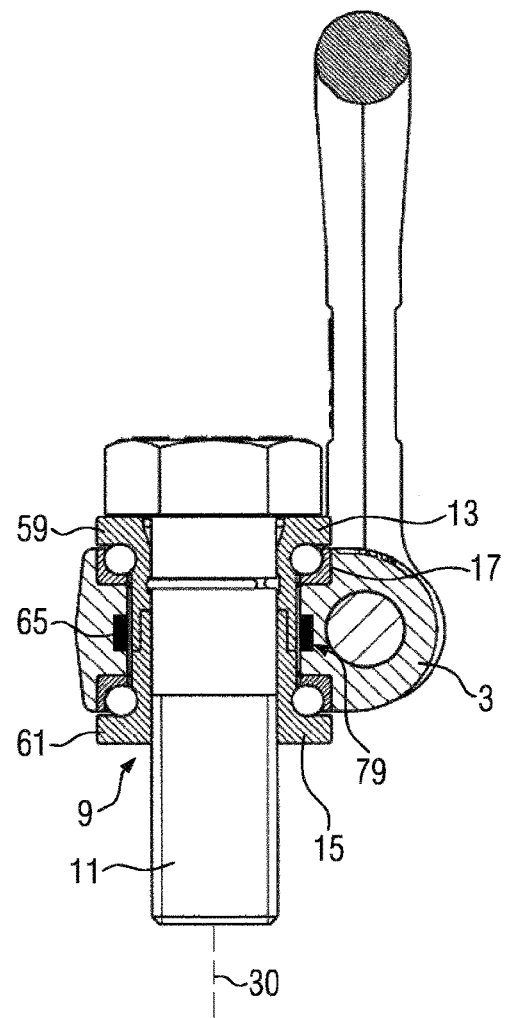
FIG. 4 shows a section through an embodiment with a braking member in the area of the press-fit connection.

FIG. 4 shows a sectional view of an attachment point 1 according to the invention with an alternative configuration of braking member 65.

Connecting element 3 comprises a continuous annular groove 79 extending circumferentially about seat 9. Braking member 65 is received in annular groove 79. Braking member 65 establishes a frictionally engaged connection between connecting element 3 and seat 9.

Annular groove 79 and braking member 65 are located in the area of the press-fit connection 17 interconnecting the two bushings 13 and 15. Annular groove 79 and braking member 65, as shown in FIG. 9, can from the perspective along longitudinal axis 30 of fastening device 11 be located centrally between the two ring flanges 59 and 61.

As an alternative to a continuous annular braking member 65, at least one braking member 65 not extending annularly around seat 9 can be disposed between seat 9 and connecting element 3.

Figure 5:
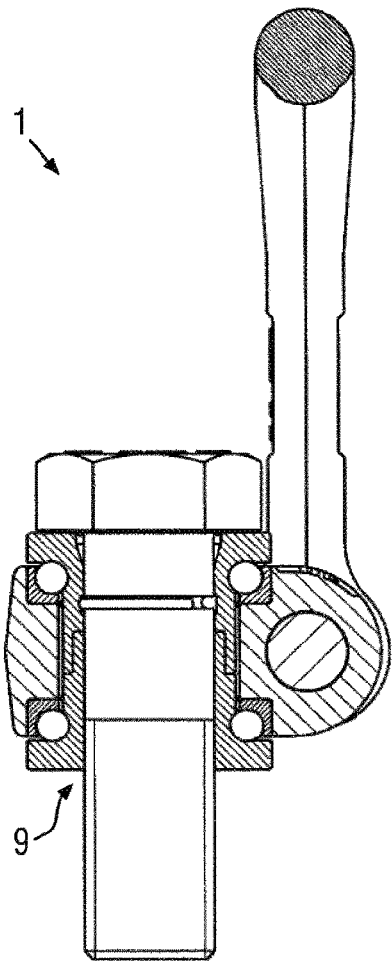
FIG. 5 shows a section through an embodiment without a braking member.

FIG. 5 shows a sectional view of a further advantageous embodiment of an attachment point 1 according to the invention.

If particularly high mobility of rotatable seat 9 is required or undesired rotation is to be excluded or negligible, then an attachment point 1 according to the invention can be formed without braking member 65.

Figure 6:
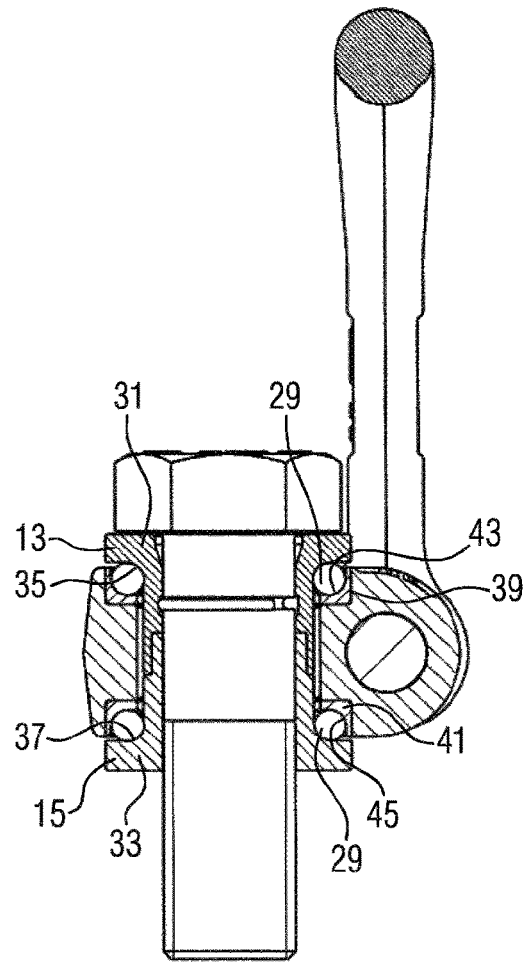
FIG. 6 shows a section through an embodiment with inner and outer races without undercuts.

FIG. 6 shows a sectional view of a further advantageous embodiment of an attachment point 1 according to the invention.

Inner races 31 and 33 and outer races 39 and 41 can be configured without undercuts. Inner races 31 and 33 and outer races 39 and 41 can comprise tracks 35, 37, 43 and 45 for rolling elements 29, where tracks 35, 37, 43, 45 have a substantially quarter-circle-shaped profile. This embodiment allows a reduced enclosure of rolling elements 29 by inner races 31 and 33 and outer races 39 and 41 as compared to tracks formed with undercuts, whereby the rolling resistance of rolling elements 29 is reduced.

REFERENCE NUMERALS 1 attachment point
3 connecting element
5 section
6 pivot axis
7 attachment element
8 fixture element
9 seat
10 support opening
11 fastening device
13, 15 bushing
17 press-fit connection
19 groove
21 spring ring
23 pair of rolling bearings
25, 27 rolling bearing
29 rolling element
30 longitudinal axis
31, 33 inner race
34, 36, 42, 44 undercut
35, 37, 43, 45 track
39, 41 outer race
47, 49 flat recesses
51 upper side
53 lower side
55 radial width of the outer race
57 radial dimension of the rolling element
59, 61 ring flange
63 sealing element
65 braking member
67 thread
69 screw head
71 inner thread
73 threaded pin
74 drive mechanism
75 support element
77 seat opening
79 annular groove

The invention claimed is:

1. Attachment point (1) comprising a connecting element (3) which comprises a section (5) for connecting an attachment device, a seat (9) through which a fastening device (11) can be guided, and at least one pair of rolling bearings (23) between said seat (9) and said connecting element (3), wherein said connecting element (3) is rotatable relative to said seat (9) and wherein the rolling bearings (25, 27) of said pair of rolling bearings (23) each comprise at least one rolling element (29), wherein said rolling bearings (25, 27) of said pair of rolling bearings (23) each comprise an outer race (39, 41) attached to said connecting element (3), characterized in that said seat (9) comprises at least one bushing (13, 15) which forms an inner race (31, 33) for at least one rolling bearing (25, 27) of said pair of rolling bearings (23), wherein said inner race (31, 33) encloses said at least one spherical rolling element (29) of said rolling bearing (25, 27) by more than 90°.

2. Attachment point (1) according to claim 1, characterized in that said rolling bearings (25, 27) each comprise said at least one spherical rolling element (29) which is, by said outer race (39, 41), enclosed by more than 90°.

3. Attachment point (1) according to claim 1 or 2, characterized in that a radial width (55) of said outer race (39, 41) of at least one rolling bearing (25, 27) corresponds to a radial dimension (57) of the rolling element (29) abutting said outer race (39, 41).

4. Attachment point (1) according to claim 1, characterized in that said outer race (39, 41) of said at least one rolling bearing (25, 27) comprises an undercut (34, 36) in which said at least one rolling element (29) of said rolling bearing (25, 27) is supported in a positive-fit manner.

5. Attachment point (1) according to claim 4, characterized in that said at least one undercut (34, 36) forms a track (35, 37) for said at least one rolling element (29).

6. Attachment point (1) according to claim 1, characterized in that said inner race (31, 33) of said at least one rolling bearing (25, 27) comprises an undercut (42, 44) in which said at least one rolling element (29) of said rolling bearing (25, 27) is supported in a positive-fit manner.

7. Attachment point (1) according to claim 6, characterized in that said at least one undercut (42, 44) forms a track (43, 45) for said at least one rolling element (29).

8. Attachment point (1) according to claim 1, characterized in that said seat (9) comprises two bushings (13, 15) that are axially connected via a press-fit connection (17) and each comprise said inner race (31, 33).

9. Attachment point (1) according to claim 8, characterized in that said outer race (39, 41) is at least one bushing (13, 15) captively supported via said at least one rolling element (29).

10. Attachment point (1) according to claim 8, characterized in that at least one of said two bushings (13, 15) of said seat (9) comprises an inner thread (71) and said seat (9) further comprises a drive mechanism that is rotatably drivable by positive-fit engagement with said inner thread (71) and accessible from outside the seat (9).

11. Attachment point (1) according to claim 8, characterized in that a braking member (65) is disposed between said seat (9) and said connecting element (3) and connects said seat (9) and said connecting element (3) in a frictionally engaged manner.

12. Attachment point (1) according to claim 11, characterized in that said braking member (65) forms a sealing element (63) of said rolling bearing (25, 27).

13. Attachment point (1) according to claim 11, characterized in that said braking member (65) is arranged in the area of the press-fit connection (17) between said seat (9) and said connecting element (3).

14. Attachment point (1) according to one of the claim 1, characterized in that said at least one rolling bearing (25, 27) of said pair of rolling bearings (23) is a solid ball.

15. Attachment point (1) comprising a connecting element (3) which comprises a section (5) for connecting an attachment device, a seat (9) for a fastening device (11) and at least one pair of rolling bearings (23) between said seat (9) and said connecting element (9), wherein said connecting element (3) is rotatable relative to said seat (9) and wherein the rolling bearings (25, 27) of said pair of rolling bearings (23) each comprise at least one rolling element (29), wherein said rolling bearings (25, 27) of said pair of rolling bearings (23) each comprise an outer race (39, 41) attached to said connecting element (3), wherein said seat (9) comprises two bushings (13, 15) that are axially connected via a press-fit connection (17) and each comprise an inner race (31, 33) for at least one rolling bearing (25, 27) of, wherein said inner races (31, 33) each enclose at least one spherical rolling element (29) of said rolling bearing (25, 27) by more than 90°, characterized in that one of the bushings (13, 15) is provided with an inner thread (71) and with a drive mechanism that is rotatably drivable by positive-fit engagement and accessible from the outside.

16. Attachment point (1) comprising a connecting element (3) which comprises a section (5) for connecting an attachment device, a seat (9) for a fastening device (11) and at least one pair of rolling bearings (23) between said seat (9) and said connecting element (9), wherein said connecting element (3) is rotatable relative to said seat (9) and wherein the rolling bearings (25, 27) of said pair of rolling bearings (23) each comprise at least one rolling element (29), wherein said rolling bearings (25, 27) of said pair of rolling bearings (23) each comprise an outer race (39, 41) attached to said connecting element (3), characterized in that said seat (9) comprises two bushings (13, 15) that are axially connected via a press-fit connection (17) and each comprises an inner race (31, 33), wherein said inner race (31, 33) encloses at least one spherical rolling element (29) of said rolling bearing (25, 27) by more than 90°.

17. Attachment point (1) according to claim 16, characterized in that an outer race (39, 41) is at least one bushing (13, 15) captively supported via at least one rolling element (29).

18. Attachment point (1) according to claim 16, characterized in that said seat (9) comprises a bushing (13, 15) with an inner thread (71) and a drive mechanism that is rotatably drivable by positive-fit engagement and accessible from the outside.

* * * * *